May 18, 1965 G. D. WILEY 3,184,035
FISH STICK DISTRIBUTING APPARATUS
Filed June 19, 1963 2 Sheets-Sheet 1
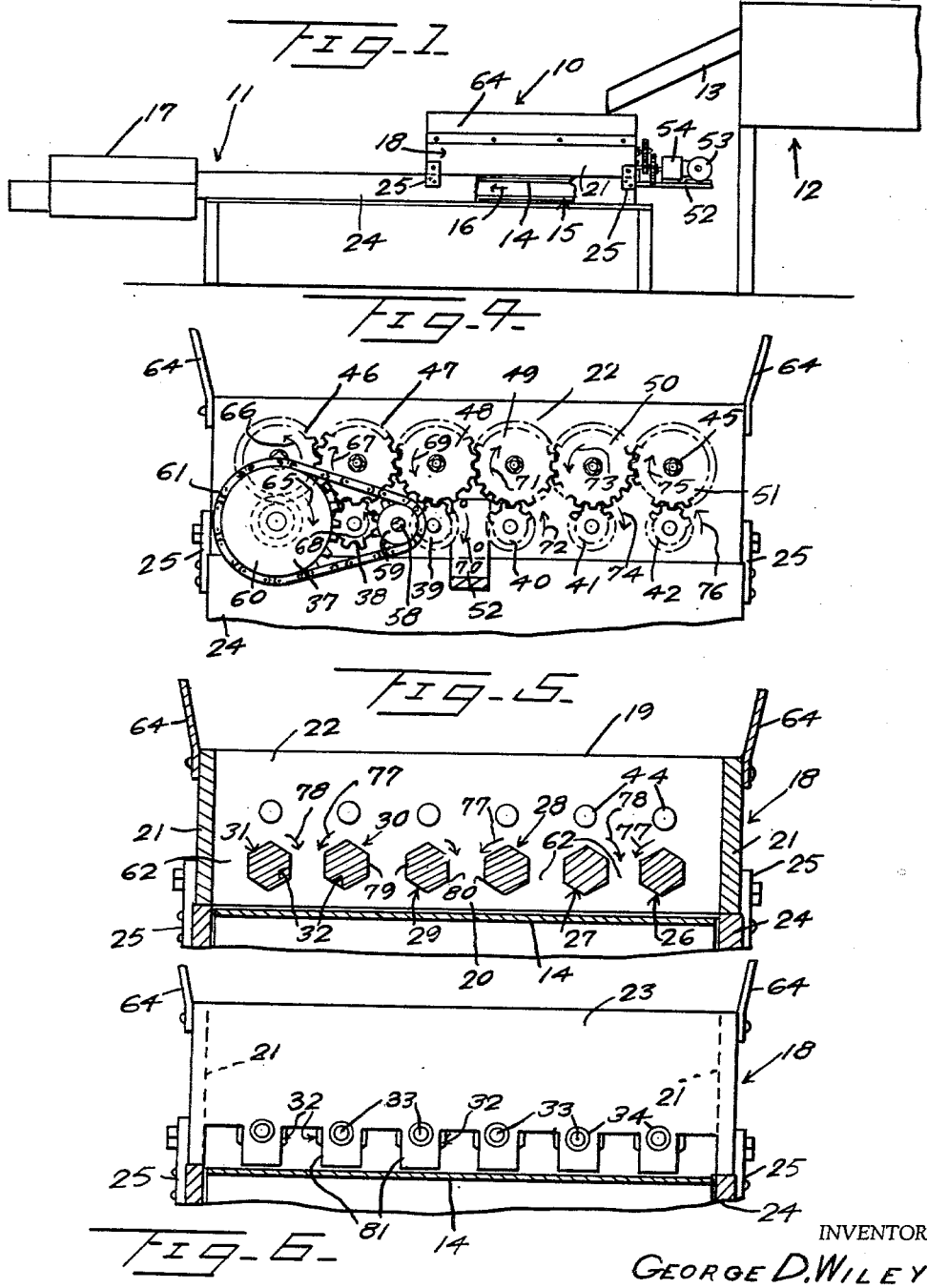
INVENTOR
GEORGE D. WILEY
BY John N. Randolph
ATTORNEY

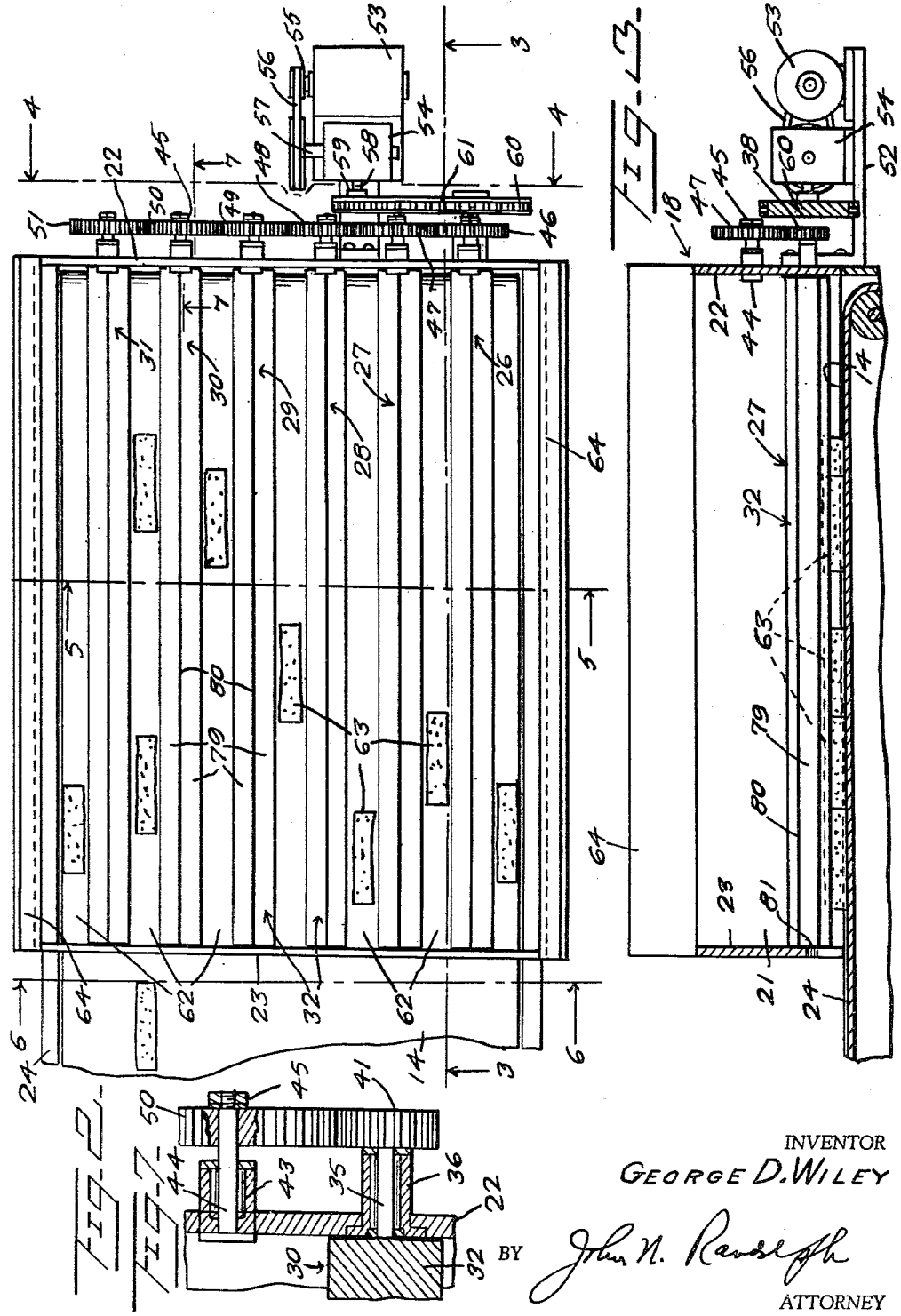

United States Patent Office 3,184,035
Patented May 18, 1965

3,184,035
FISH STICK DISTRIBUTING APPARATUS
George D. Wiley, 37 Cherry Lane, R.D. 3,
Doylestown, Pa.
Filed June 19, 1963, Ser. No. 288,986
2 Claims. (Cl. 198—33)

This invention relates to an apparatus for use in connection with an endless conveyor forming a part of a production line by which fish sticks are processed and prepared for marketing.

More particularly, it is a primary object of the present invention to provide an apparatus which will separate and deposit fish sticks in a predetermined pattern or manner on an endless conveyor to facilitate the further handling and processing of the fish sticks upon reaching a station of the production line at which the fish sticks are discharged from the endless conveyor.

Another object of the invention is to provide a distributing apparatus which will eliminate substantial manual labor now required in the processing of fish sticks and which will efficiently accomplish an operation normally requiring three persons.

Still a further object of the invention is to provide a distributor having novel means for orienting and separating the fish sticks passing therethrough and by which the fish sticks will be deposited onto an endless conveyor lengthwise thereof and in transversely spaced longitudinally extending rows to enable the fish sticks to be handled with maximum facility when discharged from the endless conveyor.

Another object of the invention is to provide a distributing apparatus which may form an attachment for a conventional fish stick processing production line, which is self-powered and which will in no way alter the operation of conventional units of the apparatus, constituting the production line, and with which the distributor is utilized.

Various other objects and advantages of the invention will hereinafter become more fully apparent from the following description of the drawings, illustrating a presently preferred embodiment thereof, and wherein:

FIGURE 1 is a fragmentary side elevational view, partly broken away, showing the invention in conjunction with a portion of a fish stick processing apparatus;

FIGURE 2 is an enlarged top plan view of the invention and a part of the apparatus with which it functions;

FIGURE 3 is a longitudinal sectional view taken substantially along a plane as indicated by the line 3—3 of FIGURE 2;

FIGURE 4 is a transverse sectional view, primarily in end elevation, taken substantially along the line 4—4 of FIGURE 2;

FIGURE 5 is a fragmentary cross sectional view taken substantially along a plane as indicated by the line 5—5 of FIGURE 2;

FIGURE 6 is a fragmentary cross sectional view, primarily in end elevation, taken substantially along a plane as indicated by the line 6—6 of FIGURE 2, and FIGURE 7 is an enlarged fragmentary vertical sectional view, taken substantially along a plane as indicated by the line 7—7 of FIGURE 2.

Referring more specifically to the drawings, the fish stick distributing apparatus or device comprising the invention is designated generally 10 and is illustrated in FIGURE 1 in conjunction with a portion of an otherwise conventional fish stick processing apparatus, designated generally 11, and forming a production line for processing fish sticks. The apparatus or production line 11 includes a conventional chopping machine 12 in which slabs of frozen fish, not shown, are cut up into sticks which are discharged from the chopping machine 12 down an inclined chute 13. The fish sticks are normally discharged from the lower end of the chute 13 onto the upper flight 14 of an endless conveyor belt 15 which is traveling in the direction as indicated by the arrow 16, away from the chopping machine 12, for conveying the fish sticks to a station 17 of the production line or apparatus 11 where the fish sticks are further processed, preparatory to being packaged for sale to the ultimate consumer or user. The fish sticks cut from the frozen fish slabs in the chopping machine 12 tend to adhere together when discharged from the chute 13 onto the belt flight 14. The services of several employees are required for separating the adhering fish sticks and for properly orienting the fish sticks on the belt flight 14 so that they can be expeditiously handled at the station 17.

The distributing device or apparatus 10 provides an attachment for the otherwise conventional apparatus 11 for separating the adhering fish sticks which are discharged from the chute 13 and for depositing the fish sticks in properly oriented positions on the upper belt flight 14 so that the fish sticks will be properly positioned for handling at the station 17, so that the apparatus or device 10 eliminates the need for the services of several employees normally required to separate and correctly orient the fish sticks on the belt flight 14.

The apparatus 10 includes a rectangular frame, designated generally 18, having an open top 19 and an open bottom 20. The frame 18 includes complementary side walls 21 and end walls 22 and 23. The width of the frame 18 is preferably of approximately the same width as that of a frame 24 in which the belt 15 is supported for movement and which frame 24 may additionally support means, not shown, for driving the belt 15 and which can be of any conventional construction. Brackets 25 are secured to the sides of the frame 24 and to the frame sides 21 for supporting the frame 18 on top of a portion of the frame 24, and so that the lower end of the chute 13 discharges into the frame 18 through its open top 19.

Six shafts 26, 27, 28, 29, 30 and 31 extend longitudinally through the housing 18. Each of said shafts has a portion 32 extending between the end walls 22 and 23 which is of noncircular cross section, preferably hexagon shape in cross section, as best seen in FIGURE 5. Each shaft has a restricted stem 33 of circular cross section at one end thereof which is journaled in an antifriction bearing 34 in the end wall 23. Each shaft has a restricted extension or stem 35 of circular cross section at its opposite end which extends through and is journaled in an antifriction bearing 36 of the end wall 22. Pinions 37, 38, 39, 40, 41 and 42 are fixed to the stems 35 of the shafts 26, 27, 28, 29, 30 and 31, respectively, beyond the bearings 36.

Antifriction bearings 43 are provided in the end wall 22 directly above each of the bearings 36, and each bearing 43 supports and journals a stub shaft 44. A gear is fixed on the outer end of each stub shaft 44 in any suitable manner as by a locknut 45. One of said gears 46 is disposed above and meshes with the pinion 37 and with an adjacent gear 47. Gear 47 meshes with the pinion 38 which is disposed therebeneath and with a gear 48. The gear 48 meshes with the pinion 39 and with a gear 49. The gear 49 meshes with the pinion 40 and a gear 50. Gear 50 meshes with pinion 41 and a gear 51 which also meshes with the pinion 42.

A bracket 52 is supported by and extends outwardly from the end wall 22 and outwardly with respect to an end of the frame 24, as best seen in FIGURE 3, for supporting a power source such as an electric motor 53 and a reduction gear unit 54. The armature or drive shaft 55 of the motor 53 is connected by a belt and pulley drive 56 to the input shaft 57 of the reduction gear unit 54 which has an output shaft 58 provided with a sprocket wheel 59. A larger sprocket wheel 60 is mounted on the outer end of the stem 35 of the shaft 26, outwardly with respect to the pinion 37, and is connected to the sprocket wheel 59 by an endless chain 61, as best seen in FIGURE 4. The shafts 26–31 are disposed coplanar with one another and in equally spaced apart relation to one another, and the shafts 26 and 31 are spaced from the wall 21, adjacent to which they are disposed, each a distance approximately equal to the spacing between the adjacent shafts, as seen in FIGURE 5. The spaces between the shafts 26–31 and between the two outermost shafts and the walls 21 form passages 62 through which fish sticks 63 may pass downwardly onto the upper belt flight 14, as will hereinafter be more fully described. The side walls 21 have upwardly extending outwardly flared deflector members 64 for deflecting fish sticks 63 from the chute 13 into the frame 18 and for confining the fish sticks therein.

Referring to FIGURE 2, the input shaft 57 is driven from the motor 53 by the belt and pulley drive 56 for driving the output shaft 58. The shaft 58 turns in a clockwise direction as seen in FIGURE 4 so that the sprocket wheels 59 and 60 and the chain 61 turn clockwise, as indicated by the arrow 65. As the sprocket wheel 60 and pinion 37 are both fixed to the stem 35 of the shaft 26 the pinion 37 also turns clockwise for driving the idler gear 46 counterclockwise, as indicated by the arrow 66. The idler gear 47 is driven clockwise, as indicated by the arrow 67, for driving the pinion 38, fixed to the shaft 27, in a counterclockwise direction, as indicated by the arrow 68, and the idler gear 48 also in a counterclockwise direction as indicated by the arrow 69. The idler gear 48 in turn drives the pinion 39, fixed to the shaft 28, in a clockwise direction as indicated by the arrow 70, and also drives the idler gear 49 in the same direction, as indicated by the arrow 71. The idler gear 49 drives the pinion 40, fixed to the shaft 29, in a counterclockwise direction, as indicated by the arrow 72, and also drives the idler gear 50 in a clockwise direction, as indicated by the arrow 73. The idler gear 50 drives the pinion 41, fixed to the shaft 30, in a clockwise direction, as indicated by the arrow 74, and likewise drives the idler gear 51 counterclockwise, as indicated by the arrow 75. The idler gear 51 drives the pinion 42 of the shaft 31 in a counterclockwise direction, as indicated by the arrow 76. Thus, the adjacent shafts are driven in opposite directions relative to one another.

As seen in FIGURE 5, looking from the opposite direction relative to FIGURE 4, the shafts 26, 28 and 30 turn counterclockwise as indicated by the arrows 77 while the shafts 27, 29 and 31 turn clockwise, as indicated by the arrows 78. Thus the adjacent portions of the shafts 26 and 27, 28 and 29, and 30 and 31 rotate downwardly.

As is apparent from FIGURE 2, the fish sticks 63 are of a width less than the width of the spaces 62 but are of a length substantially greater than the width of said spaces. The frozen fish sticks 63 will be discharged at random from the chute 13 into the frame 18 and onto the shaft portions 32. Said revolving shaft portions 32, due to their noncircular cross sectional shape, will agitate the fish sticks 63 which are in contact therewith to separate the adhering fish sticks, which separated fish sticks will move about on the shaft portions 32 until they have assumed positions nearly parallel to said shaft portions and so that the fish sticks can pass downwardly through the passages 62 onto the upper belt flight 14. While the majority of the fish sticks 63 will pass through the passages 62 formed by the pairs of shafts 26 and 27, 28 and 29, and 30 and 31, some of the fish sticks will obviously escape through the other passages 62 between the shafts as well as those formed by the shafts and side walls 21. It will be obvious that the widths of the passages 62 will vary as the shaft portions 32 revolve, since when sides or elements 79 of said shaft portions are disposed in opposed relation to one another, as seen in FIGURE 5, the width of the passages 62 will be greater than when longitudinal ridges or edges 80 of the shaft portions 32 are located directly opposite to one another. Thus, the rate of discharge of the fish sticks 63 onto the upper belt flight 14 will be intermittent or varied to a limited extent.

As seen in FIGURE 2, the fish sticks 63 will be caused to assume positions on the belt flight 14 by the distributor shaft portions 32 so that said fish sticks will be disposed in transverse rows and with the individual fish sticks of each row disposed longitudinally of the belt flight 14 and directly beneath a passage 62. As seen in FIGURE 6, the end wall 23, toward which the upper belt flight 14 moves, has notches 81 forming passageways, which are located in longitudinal alignment with the passages 62 and thus disposed so that the separated and oriented fish sticks 63, carried by the belt flight 14, will pass through said passageways 81 in their travel to the station 17. It will thus be seen that the apparatus 10 functions to effectively separate and orient the fish sticks on the belt flight 14, so that the fish sticks can be conveniently and expeditiously handled upon reaching the processing station 17 and without being manually touched from the time that the fish sticks are discharged from the chute 13 until they have reached the station 17.

The size of the attachment 10 can obviously vary and said attachment may include a greater or lesser number of the shafts 26–31 and with a greater or lesser spacing between said shafts, depending upon the size of the items being processed. While the invention has been described in connection with fish sticks, it will be readily apparent that it could be utilized with other items being processed.

Various other modifications and changes are likewise contemplated and may be resorted to, without departing from the function or scope of the invention as hereinafter defined by the appended claims.

I claim as my invention:

1. A fish stick distributing apparatus comprising a frame having side walls and end walls, said frame having an open top and an open bottom, means adapted to support said frame above an endless conveyor and beneath the discharge end of a chute, a plurality of shafts extending between and through said end walls, means supporting and journaling said shafts in said walls in transversely spaced apart substantially parallel relation to one another for defining long narrow passages therebetween of a width determined solely by the spacing between adjacent shafts, driving means connected to complementary ends of each of said shafts for revolving the shafts simultaneously at uniform speeds and with adjacently disposed shafts rotating in opposite directions to one another, said passages between the shafts being of a width greater than the maximum cross sectional dimensions of fish sticks discharged into the frame onto the shafts from said chute and substantially less than the length of the fish sticks whereby the fish sticks will be oriented into positions lengthwise of the shafts for discharge downwardly through said passages onto said endless conveyor in transversely spaced longitudinal rows with the individual fish sticks disposed longitudinally of the conveyor, the portions of said shafts disposed between said end walls being of noncircular shape in cross section for agitating and separating the fish sticks in contact therewith, said driving means revolving the shafts such that similar elements of adjacent oppositely rotating shafts will assume positions in opposed relation to one another.

2. A fish stick distributing apparatus comprising a frame having side walls and end walls, said frame having an open top and an open bottom, means adapted to support said frame above an endless conveyor and beneath the discharge end of a chute, a plurality of shafts extending between and through said end walls, means supporting and journaling said shafts in said walls in transversely spaced apart substantially parallel relation to one another for defining long narrow passages therebetween of a width determined solely by the spacing between adjacent shafts, driving means connected to complementary ends of each of said shafts for revolving the shafts simultaneously at uniform speeds and with adjacently disposed shafts rotating in opposite directions to one another, said passages between the shafts being of a width greater than the maximum cross sectional dimensions of fish sticks discharged into the frame onto the shafts from said chute and substantially less than the length of the fish sticks whereby the fish sticks will be oriented into positions lengthwise of the shafts for discharge downwardly through said pasages onto said endless conveyor in transversely spaced longitudinal rows with the individual fish sticks disposed longitudinally of the conveyor, the portions of said shafts disposed between said end walls being of hexagon shape in cross section and being oriented relative to one another such that sides of adjacent oppositely rotating shafts assume positions in opposed relation to one another for increasing the widths of the passages between said shafts relative to the widths thereof as defined by ridges between adjacent sides of two adjacent shafts when disposed in opposed relation to one another.

References Cited by the Examiner
UNITED STATES PATENTS

| | | | |
|---|---|---|---|
| 1,726,812 | 9/29 | Eggert | 198—56 X |
| 2,688,393 | 9/54 | Uschmann | 198—56 |
| 2,758,697 | 8/56 | Schultz | 198—30 |

SAMUEL F. COLEMAN, *Primary Examiner.*

WILLIAM B. LA BORDE, *Examiner.*